United States Patent
Fraas

Patent Number: 5,961,703
Date of Patent: Oct. 5, 1999

[54] AQUEOUS INK HAVING AN EXTENDED CAP-OFF TIME AND PROCESS OF MANUFACTURE THEREOF

[75] Inventor: Rosmarie Fraas, Schwaig, Germany

[73] Assignee: J.S. Staedtler GmbH & Co., Nürnberg, Germany

[21] Appl. No.: 09/134,330

[22] Filed: Aug. 14, 1998

[30] Foreign Application Priority Data

Aug. 15, 1997 [DE] Germany ............ 197 35 604

[51] Int. Cl.$^6$ .................................. C09D 11/00
[52] U.S. Cl. .................. 106/31.29; 106/31.31; 106/31.38; 106/31.58; 106/31.86; 106/31.63; 106/31.7
[58] Field of Search ............ 106/31.29, 31.31, 106/31.63, 31.7, 31.58, 31.86

[56] References Cited

U.S. PATENT DOCUMENTS

| | | | |
|---|---|---|---|
| 4,545,818 | 10/1985 | Inoue et al. | 106/31.29 |
| 4,671,691 | 6/1987 | Case et al. | 106/31.38 |
| 5,810,915 | 9/1998 | Nagai et al. | 106/31.43 |

FOREIGN PATENT DOCUMENTS

| | | |
|---|---|---|
| 0359805 | 3/1990 | European Pat. Off. . |
| 2540881 | 8/1984 | France . |
| 530800 | 8/1931 | Germany . |
| 1913174 | 6/1970 | Germany . |
| 3422594 | 12/1985 | Germany . |
| 3337866 | 10/1986 | Germany . |
| 3941662 | 3/1992 | Germany . |
| 647660 | 2/1963 | Japan . |

OTHER PUBLICATIONS

Derwent Information Ltd., 87–195224, Daicel Chem Ing Ltd., 1998.
Derwent Information Ltd., 91–372762, Pentel KK, 1998.
Derwent Information Ltd., 92–011398, Sakura Kurepasu KK, 1998.
Derwent Information Ltd., 83–761840, Fujitsu Ltd, 1998.

*Primary Examiner*—Mark L. Bell
*Assistant Examiner*—Veronica Faison
*Attorney, Agent, or Firm*—Friedrich Kueffner

[57] ABSTRACT

An aqueous ink having an extended cap-off time and a process for manufacturing the ink, wherein the aqueous ink is composed of water as the predominant or exclusive solvent, hydrocolloid/hydrocolloids or polysaccharide/polysaccharides as binding agents or film-forming agents, moist-keeping agents, coloring agents, emulsifying agents and possibly additional additives, wherein the ink further includes gum arabic and bees wax as film-forming agents. The ink is particularly an ink for writing, drawing, painting, printing or marking on normal paper or other absorbent writing carriers. The ink is particularly intended for use in fountain pens, ballpoint pens or stencil writers, in so-called felt-tip pens or pencils, in ink jet systems and/or in other capillary duct writing devices or systems.

27 Claims, No Drawings

AQUEOUS INK HAVING AN EXTENDED CAP-OFF TIME AND PROCESS OF MANUFACTURE THEREOF

BACKGROUND OF THE INVENTION

1. Field of the Invention

The present invention relates to an aqueous ink having an extended cap-off time and a process for manufacturing the ink.

2. Description of the Related Art

The ink is particularly an ink for writing, drawing, painting, printing or marking on normal paper or other absorbent writing carriers. The ink is particularly intended for use in fountain pens, ballpoint pens or stencil writers, in so-called felt-tip pens or pencils, in ink jet systems and/or in other capillary duct writing devices or systems.

Off-time is understood to be the time period over which a writing device or writing system may remain open, i.e., with the cap off, stored or unused without drying.

Aqueous inks are known in principle and usually contain water as solvent and pigments or water-soluble dyes as coloring agents. They usually additionally contain additives, such as tensides, emulsifying agents, preservatives, moist-keeping agents and/or glycols.

The principal disadvantage of these inks is their usually very short cap-off time when used, for example, in felt-tip pens, these usually aqueous dye-type inks dry up already after a very short period of time, i.e., usually within a few hours, if they are not closed in an air-tight manner by a protector.

The dye additionally frequently crystallizes at the tip or nozzle and clogs the tip or nozzle. Even if such pens or nozzles are closed again later, the pen or push button usually cannot regenerate again. Even after a relatively short period with the cap off, most of these conventional devices have a poor start-up or break-in behavior or do not work at all with such inks, or they must be reactivated possibly by very long start-up attempts, unless they are not already completely useless.

Various solutions have been proposed for increasing the cap-off time or for improving the drying-up behavior of such inks.

For example, DE-PS 530 800 describes a quick-drying writing liquid which does not dry up in the pen and in the writing device, wherein the liquid, in addition to volatile components, such as alcohols, etc., is supposed to contain organic acid esters of glycerin or glycol in order, on the one hand, to effect a quick drying of the writing on the paper and, on the other hand, to prevent quick drying within the writing device.

In accordance with DE-AS 19 13 174, an ink preparation on an aqueous basis is also supposed to contain an organic vehicle, or a special alkyl amide, in order to prevent or delay drying within a porous pen tip.

DE-PS 39 41 662 discloses a writing liquid in the form of an ink on an aqueous basis to which are added special polyglycol ethers in order also to reduce or delay drying of the ink in the writing device.

EP-PS 359 805 proposes the use of solids as antiblock additives for marking liquids in order to provide an evaporation-retarding closure for effectively preventing drying of the ink in unprotected or unused capillary outlet openings of writing devices or nozzles. To be considered as such soluble solids are, among others, inorganic salts, organic salts or other organic compounds, amino acids, urea, sulfur compounds, etc.

In addition, JP-P/AS 6-47 660 describes an ink having an increased cap-off time which can be stored over a long period of time without protector. This ink is composed of a dye, an organic solvent, resin, decaglycerin and a-olefin (alpha-olefin).

Olefin is the group designation for acyclic and cyclic aliphatic hydrocarbons with one or more reactive double bonds in the molecule. When the ink contains a-olefins, the double bond is between the first and second carbon atom and the ink is highly reactive because of its unsaturated character. The disadvantage of this ink is the presence of the a-olefins which may have the result that the ink is not stable during storage because of reactions of the a-olefin with other ink components.

All other proposed solutions have the additional disadvantage that, in the same manner as other commercially available recipes with basic dyes and ethylene glycol which actually also usually have a good cap-off time, the use of the raw materials is not necessarily safe with respect to their toxicological and physiological properties and may lead to problems when used in the end products, particularly by children.

SUMMARY OF THE INVENTION

Therefore, it is the primary object of the present invention to provide an ink, and a process for manufacturing the ink, wherein the ink can be used widely and is toxicologically and physiologically safe and still has a relatively long cap-off time, and wherein the dyes, even when stored open for a longer period of time, do not crystallize. In addition, the expected properties of ink, such as washability from textiles and good writing properties, should be maintained and the storage capability of the writing devices should be improved.

In accordance with the present invention, the aqueous ink with extended cap-off time is composed of water as the predominant or exclusive solvent, hydrocolloid/hydrocolloids or polysaccharide/polysaccharides as binding agents or film-forming agents, moist-keeping agents, coloring agents, emulsifying agents and possibly additional additives, wherein the ink further includes gum arabic and bees wax as film-forming agents.

In the following, the special properties and operation of the individual raw materials or components of the inks according to the present invention will be explained.

The various features of novelty which characterize the invention are pointed out with particularity in the claims annexed to and forming a part of the disclosure. For a better understanding of the invention, its operating advantages, specific objects attained by its use, reference should be had to the following descriptive matter in which there are described preferred embodiments of the invention.

DETAILED DESCRIPTION OF THE INVENTION a) Solvent:

The solvent of the proposed ink is exclusively water, preferably deionized or demineralized water, in a quantity of about 30 to 90% by weight.

b) Binding agent/Film-forming agent:

1.) Gum Arabic:

Gum arabic is a dried exudate of Acacia Senegal and other acacia species, a mixture of calcium salts, magnesium salts and potassium salts of polyarabic acid. This polymeric acid is a long-chain branched molecule having an average molecular weight of about 24,000. Gum arabic belongs to the hydrocolloids and, thus, is capable of interacting with the emulsifying particles by being deposited in a complex-like manner at the particles to be protected. They reinforce the loading or the solvate sheathing or both of the particles to be protected.

Hydrocolloids form hydrogels with water which dry up to form protective films.

Preferably, a prefabricated 10% gum arabic solution is used.

Hydrocolloids are polysaccharides and their macromolecules differ with respect to:

a) linear polysaccharides: they form a simple chain (e.g., alginates);

b) substituted linear polysaccharides, such as galactomanones, xanthene;

c) branched polysaccharides such as gum arabic:

Gum arabic is distinguished by a very good water solubility. It is even possible to produce 40% solutions which still exhibit Newtonian flow behavior. In higher concentrations, the solutions become pseudoplastic. If salts are added to the solution, the viscosity is significantly reduced.

2.) Bees wax:

Natural bees wax is one of the oldest raw materials in the production of cosmetics and is primarily used for regulating the consistency and because of its emulsifying properties. In addition, the thermoplastic property of the bees wax is utilized.

For the cap-off ink, preferably a commercially available aqueous bees wax emulsion is used which is a dispersion having a solids content of 18% by weight bees wax with ephoxylated fatty alcohol ether as emulsifying agent.

Bees wax is a mixture of 70 to 75% various esters of C26–C32 alcohols primarily with palmitin, -hydroxy palmitin, –αβ dihydroxy palmitin and cerotic acid, about 14% free wax acid, about 12% hydrocarbon, about 1% fatty acid stearic fatty acid esters and free wax alcohols used in an amount of at most 1%.

3.) Coloring agents:

Water-soluble dyes on the basis of food dyes and/or acid dyes are to be used. Preferably, acid dyes or food dyes are used for the proposed inks in which the inks with acid dyes have a significantly longer cap-off time than inks with food dyes. Depending on the color, the amount of dyes used is between 0.5 and 10% by weight. It is advantageous to use dyes having good solubility in water. Also important for the drying-up behavior is the concentration of the dyes in the ink. For example, a yellow ink has a longer cap-off time than a black ink because usually less dye is required in yellow ink than in black ink.

For improving the cap-off time of writing devices with a aqueous ink, the use of the dye classes also place a significant roll.

Depending on the dye class, a cap-off time of 14 days to 4 weeks and longer can be achieved. Even dried-up tips regenerate after about 10 hours when the device is closed.

The following dyes have been found to be particularly suitable:

1.) Food dyes from the group:

Food Yellow 3; Food Yellow 13; Food Yellow 4; Food Red 7; Food Red 14; E 133, Food Blue 2 and/or Food Blue 3 and/or 2.) Acid dyes form the group:

Acid Yellow 23; Acid Red 18; Acid Red 51; Acid Orange 4; Acid Blue 93; Acid Blue 9; Acid Blue 104 and/or Acid Violet 49.

d) Moist-keeping agents:

Diethylene glycol in a quantity of 25 to 35% by weight is preferably to be used as the moist-keeping agent.

The addition of glycols to the aqueous phase improves the stability of oil-in-water emulsions, wherein the inks according to the present invention are basically of this type. In addition, because of their hygroscopic properties, these additives prevent drying of the emulsion.

Other suitable moist-keeping agents are, for example, glycerin, propylene glycol and/or polyglycols.

These agents also increase the cap-off time, however, the best results are achieved with diethylene glycol.

In order to stabilize an emulsion over a long period of time, it is necessary to use auxiliary agents which prevent the segregation of the two phases. This can be achieved by:

e) stabilizers or emulsifying agents.

e1) stabilizers act by increasing the viscosity and by forming mechanically stable interface films which stabilize the mechanically produced emulsions;

e2) emulsifiers are categorized in accordance with a certain system.

The system is the HLB system developed by Atlas Chemie (hydrophilic/lipophilic balance).

In the HLB system, each emulsifying agent has a numeric value which is called HLB value.

The HLB value indicates the hydrophilic/lipophilic equilibrium. All emulsifying agents contain hydrophilic as well as lipophilic groups. A lipophilic emulsifying agent has a low HLB value of below 9.0 and a hydrophilic emulsifying agent has a high HLB value of above 11.0.

Emulsifying agents having low HLB values have the tendency to be soluble in oil, while emulsifying agents with high HLB values are water soluble.

For example, a water-soluble emulsifying agent is used if the final product can be diluted with water.

Oil-in-water emulsifying agents have HLB values of between 8 and 18. Hydrophilic emulsifying agents with high HLB values promote the formation of an oil-in-water emulsion.

In the ink proposed according to the present invention, preferably commercially available emulsifying agents are used as non-ionogenic solubilizers, wherein these emulsifying agents are available, for example, as viscous solutions and are manufactured by reacting ethylene oxide with hydrated castor oil and can be composed of, for example, 90% by weight hydrated castor oil, 5% by weight 1.2-propylene glycol and 5% by water. Principal components of such emulsifying agents may also be fatty acid glycerine polyethylene glycol esther and fatty acid polyethylene glycol esther. They constitute the hydrophobic component of the products. The hydrophilic component is composed of polyethylene glycol and glycerine ethoxylate.

e3) Emulsifying Agents:

Possible emulsifying agents to be preferably considered are non-ionic emulsifying agents of the following groups:

The ink according to claim 1, wherein the nonionic emulsifying agent is selected from one or more of the following groups:

alcohol fatty acid ester, ethylene fatty acid ester, polyethylene glycol fatty acid ester, glycerine- and polyfatty acid ester, sorbite fatty acid ester, pentaerythrite fatty acid ester, fatty acid ester of glycerine ester, saccharose fatty acid ester, alcohol polyglycol ether, fatty acid polyglycol ether, fatty acid ester polyglycol ether, fatty amine polyglycol ether, polyglycol ether of fatty acid alkanolamides, polyglycol ether of fats and oils, polypropylene glycol polyglycol ether, lanoline polyglycol ether, alcohol polypropylene glycol ether, fatty acid polypropylene glycol ether, polypropylene glycol ether of fatty amines, lanoline polypropylene glycol ether.

Particularly advantageous has been found the use of a commercially available solution of about 90% by weight hydrated castor oil with about 5% by weight 1,2 propylene glycol and about 5% by weight water.

f) Preservatives:

Advantageously used as a preservative is a mixture of 12 to 60% by weight tertiary butyl hydroperoxide and 3 to 50% by weight monophenyl glycol ether as well as possibly up to 85% by weight water, propylene glycol, triethylene glycol or another suitable solvent or diluting agent as it is commercially available.

These preservatives are especially suitable for aqueous solutions and emulsions.

g) Buffer agents/triethanol amine:

Preferably used for adjusting the pH value to about 8 are about 0.1% to 0.6% by weight triethanol amine as buffer agent. The ink according to the present invention is preferably adjusted slightly alkaline in order to avoid any problems in various writing tips and/or dyes of the type used.

h) Tensides:

A particular aspect of the present invention is to be seen in the fact that the proposed inks do not utilize any tensides or other cross-linking agents. It is surprising that tensides or cross-linking agents which are usually used in these inks, are not desired or required in the ink according to the present invention. Rather, on the contrary, the entire system of the proposed ink is maintained in an optimum manner without tensides or other cross-linking agents and the cap-off time is significantly improved.

The invention will be explained in more detail with the aid of several embodiments:

i) Composition:

The proposed aqueous ink is essentially composed of the following components and/or mixtures:

1.) Solvent: about 30 to 90% by weight demineralized water;

2.) Binding agent or film-forming agent:
  a) polysaccharides/hydrocolloids=branched polysaccharides=gum arabic, for example, as a 10% gum arabic solution with preservatives in water;
  b) bees wax, for example, as an aqueous bees wax emulsion with 18% solids and ethoxilated fatty alcohol ether in water;

3.) Coloring Agent: 0.1 to 10.0% by weight water soluble dyes, particularly food dyes and/or acid dyes;

4.) Moist-keeping Agents: 10 to 40%, preferably 25 to 35% by weight diethylene glycol and/or glycerine, propylene glycol or polyglycols;

5.) Emulsifying Agents: For example, commercially available mixtures of hydrated castor oil with 1, 2-propylene glycol and water or alternatively polyethylene glycol and propylene glycol (HLB value 14–16);

6.) Preservatives: For example, a commercially available mixture of 12 to 60% by weight tertiary butyl hydroperoxide and 3 to 50% by weight monophenyl glycol ether as well as possibly a diluting agent;

7.) Buffer Agent: For example, 0.1 to 3, preferably 0.3 to 0.5% percent by weight triethanol amine as regulating agent for the pH-value adjustment (pH value about 8.0).

In accordance with a preferred process for manufacturing the inks according to the present invention, initially a basic mixture of bees wax emulsion, emulsifying agent, hydrocolloid and preservative is prepared.

j) Process:

The cap-off ink according to the present invention is manufactured as an oil-in-water emulsion.

For ensuring the effectiveness of the ink, it is also advantageous if the process sequence is precisely adhered to.

The ink is prepared from the above-prescribed components in a step-by-step manner by preparing, for example, the following mixtures:

1.) Deionized water is made available;

2.) A bees wax emulsion of water, bees wax and possibly emulsifying agent is obtained, for example, as a commercially available product;

3.) A gum arabic solution, for example, an about 10% solution, is prepared from gum arabic with water and preservative, and is added to 4.) a basic mixture of the deionized water and the bees wax emulsion and is mixed while adding emulsifying agents and moist-keeping agents.

This basic mixture is stirred

5.) into the solvent, and subsequently

6.) the coloring agent as well as

7.) the preservative and

8.) the buffer agent are added also while continuously stirring, wherein the pH-value is adjusted to about 8 and the ink is prepared as a result.

The gum arabic particles and/or bees wax particles, which are present in the ink finely dispersed, form on the tip of a felt-tip pen an elastic film which prevents evaporation of the water and drying-up of the pen over longer periods of time.

k) Process Examples:

The following process examples V1.1 to V7.0 illustrate a type of manufacture and the examples V1.1 to V4.2 with V8.1 to V10.2 demonstrate additional manufacturing possibilities.

Example V1.1) (may be commercial products)

| | |
|---|---|
| demineralized water | 80–85% by weight |
| bees wax | 15–20% by weight |

Example V1.2) (may be commercial products)

| | |
|---|---|
| demineralized water | 82% by weight |
| bees wax | 18% by weight |

Example V2.1)

| | |
|---|---|
| demineralized water | 78–93% by weight |
| preservative | 5–10% by weight |
| gum arabic | 2–12% by weigbt |

Example V2.2)

| | |
|---|---|
| demineralized water | 87% by weight |
| preservative | 9% by weight |
| gum arabic | 4% by weight |

Example V3.1)

| | |
|---|---|
| demineralized water | 2–10% by weight |
| hydrogenated castor oil | 80–96% by weight |
| 1,2-propylene glycol | 2–10% by weight |

Example V3.2)

| | |
|---|---|
| demineralized water | 5% by weight |
| hydrogenated castor oil | 90% by weight |
| 1,2-propylene glycol | 5% by weight |

Example V4.1)

| | |
|---|---|
| bees wax emulsion | 1–10% by weight |
| gum arabic solution | 2–8% by weight |
| diethylene glycol | 76–96% by weight |
| emulsifying agent | 1–6% by weight |

-continued

Example V4.2)

| | |
|---|---|
| bees wax emulsion (e.g. 18%) | 4% by weight |
| gum arabic solution (e.g. 10%) | 4% by weight |
| diethylene glycol | 88% by weight |
| emulsifying agent | 4% by weight |

Example V5.1) (starting Mixture)

| | |
|---|---|
| demineralized water | 94–99.8% by weight |
| preservative | 0.1–3% by weight |
| buffer agent | 0.1–3% by weight |

Example V5.2) (starting Mixture)

| | |
|---|---|
| demineralized water | 99.6% by weight |
| preservative | 0.3% by weight |
| buffer agent | 0.1% by weight |

Example V6.1) (Color Solution)

| | |
|---|---|
| starting mixture | 90–99.5% by weight |
| coloring agent | 0.5–10% by weight |

Example V6.2) (Color Solution)

| | |
|---|---|
| starting mixture | 94% by weight |
| coloring agent | 6% by weight |

Example V7.0) (Finished ink)

color solution + basic mixture

Example V8.1)

| | |
|---|---|
| deminineralized water | 50–70% by weight |
| bees wax-/gum arabic-emulsion | 30–50% by weight |

Example V8.2)

| | |
|---|---|
| demineralized water | 63% by weight |
| bees wax-/gum arabic emulsion | 37% by weight |

Example V9.1) (Crude ink)

| | |
|---|---|
| gum arabic solution | 90–99.5% by weight |
| dye(s) | 0.5–10% by weight |

Example V9.2) (Crude ink)

| | |
|---|---|
| gum arabic solution | 94% by weight |
| dye(s) | 6% by weight |

Example V10.1) (Finished ink)

| | |
|---|---|
| crude ink | 96–99.8% by weight |
| preservative | 0.1–3% by weight |
| buffer agent | 0.1–3% by weight |

Example V10.2) (Finished ink)

| | |
|---|---|
| crude ink | 56.5% by weight |
| preservative | 0.3% by weight |
| buffer agent | 0.2% by weight | m) Examples of recipes:
General example:

| | |
|---|---|
| bees wax: | 0.1–2% by weight |
| gum arabic: | 0.1–1% by weight |
| moisture preserving agent | 10–40% by weight |
| emulsifying agent | 1–7% by weight |
| buffer agent | 0.1–3% by weight |
| preservative | 0.1–3% by weight |
| dyes | 0.1–10% by weight |
| solvents | 34–88.5% by weight |

Example 1.) (black ink)

| | |
|---|---|
| demineralized water: | 59.9% by weight |
| preservative: | 0.2% by weight |
| triethanol amine: | 0.3% by weight |
| bees wax: | 0.2% by weight |
| emulsifying agent: | 1.4% by weight |
| gum arabic: | 0.1% by weight |
| diethylene glycol: | 31.0% by weight |
| dyes: | 6.9% by weight | used as dyes for this purpose are, for example: 1.9% by weight Food Blue 2, 3.7% by weight Food Red 7 and 1.3% by weight Food Yellow 4.

If the demands with respect to purity of the inks, particularly also with respect to the contents of heavy metals, are not very high, it is possible to use instead of the above food dyes also, for example, the following acid dyes: 1.9% by weight acid blue 104 (for example from liquid dye), 3% by weight acid red 18 and 2% by weight acid yellow 23. Such substitutions are also possible in most of the following examples, wherein the required or comparable individual acid dyes are to be selected and the quantities may have to be changed in order to achieve the desired color of the ink.

Example 2.) (brown ink)

| | |
|---|---|
| demineralized water: | 60.1% by weight |
| preservative: | 0.2% by weight |
| triethanol amine: | 0.3% by weight |
| bees wax: | 0.2% by weight |
| emulsifying agent: | 1.4% by weight |
| gum arabic: | 0.1% by weight |
| diethylene glycol: | 31.2% by weight |
| dyes: | 6.5% by weight | dyes=0.8% by weight Food Blue 2, 3.5% by weight Food Red 7 and 2.2% by weight Food Yellow 3.

Example 3.) (violet ink)

| | |
|---|---|
| demineralized water: | 62.8% by weight |
| preservative: | 0.2% by weight |
| triethanol amine: | 0.3% by weight |
| bees wax: | 0.3% by weight |
| emulsifying agent: | 1.5% by weight |
| gum arabic: | 0.1% by weight |
| diethylene glycol: | 32.6% by weight |
| dyes: | 2.2% by weight | dyes=0.7% by weight Food Blue 2 and 1.5% by weight Food Red 14.

Example 4.) (light green ink)

| | |
|---|---|
| demineralized water: | 62.5% by weight |
| preservative: | 0.2% by weight |
| triethanol amine: | 0.3% by weight |
| bees wax: | 0.3% by weight |
| emulsifying agent: | 1.4% by weight |
| gum arabic: | 0.1% by weight |
| diethylene glycol: | 32.4% by weight |
| dyes: | 2.8% by weight | dyes=0.3% by weight Food Blue 2 and 2.5% by weight Food Yellow 4.

Example 5.) (dark green ink)

| | |
|---|---|
| demineralized water: | 61.0% by weight |
| preservative: | 0.3% by weight |
| triethanol amine: | 0.1% by weight |
| bees wax: | 0.2% by weight |
| emulsifying agent: | 1.3% by weight |
| gum arabic: | 0.1% by weight |
| diethylene glycol: | 31.6% by weight |
| dyes: | 5.4% by weight | dyes=3.6% by weight Food Blue 2 and 1.8% by weight Food Yellow 4.

Example 6.) (orange ink)

| | |
|---|---|
| demineralized water: | 62.7% by weight |
| preservative: | 0.2% by weight |

-continued

| Example 6.) (orange ink) | |
| --- | --- |
| triethanol amine: | 0.1% by weight |
| bees wax: | 0.3% by weight |
| emulsifying agent: | 1.4% by weight |
| gum arabic: | 0.1% by weight |
| diethylene glycol: | 32.4% by weight |
| dyes: | 2.8% by weight | dyes=0.3% by weight Food Red 7 and 2.5% by weight Food Yellow 4.

| Example 7.) (light blue ink) | |
| --- | --- |
| demineralized water: | 63.7% by weight |
| preservative: | 0.3% by weight |
| triethanol amine: | 0.3% by weight |
| bees wax: | 0.3% by weight |
| emulsifying agent: | 1.4% by weight |
| gum arabic: | 0.1% by weight |
| diethylene glycol: | 33.0% by weight |
| dyes: | 0.9% by weight | dyes=0.7% by weight Food Blue 2 and 0.2% by weight Food Red 14.

| Example 8.) (yellow ink) | |
| --- | --- |
| demineralized water: | 62.8% by weight |
| preservative: | 0.2% by weight |
| triethanol amine: | 0.1% by weight |
| bees wax: | 0.2% by weight |
| emulsifying agent: | 1.4% by weight |
| gum arabic: | 0.1% by weight |
| diethylene glycol: | 32.4% by weight |
| dyes: | 2.8% by weight | dyes=0.1% by weight Food Red 7 and 2.7% by weight Food Yellow 4.

| Example 9.) (pink ink) | |
| --- | --- |
| demineralized water: | 62.6% by weight |
| preservative: | 0.2% by weight |
| triethanol amine: | 0.2% by weight |
| bees wax: | 0.3% by weight |
| emulsifying agent: | 1.4% by weight |
| gum arabic: | 0.1% by weight |
| diethylene glycol: | 32.4% by weight |
| dyes: | 2.8% by weight | dyes=2,8% by weight Food Red 14.

| Example 10.) (red ink) | |
| --- | --- |
| demineralized water: | 61.8% by weight |
| preservative: | 0.2% by weight |
| triethanol amine: | 0.3 by weight |
| bees wax: | 0.3% by weight |
| emulsifying agent: | 1.4% by weight |
| gum arabic: | 0.1% by weight |
| diethylene glycol: | 32.1% by weight |
| dyes: | 3.8% by weight | dyes=0.9% by weight Food Red 14, 2.7% by weight Food Red 7 and 0,9% by weight Food Yellow 4.

These dyes can also be replaced, for example, by about 4% by weight acid red 18 if this is desired; in that case, the difference in quantity is compensated by a changed or adjusted water content.

The invention is not limited by the embodiments described above which are presented as examples only but can be modified in various ways within the scope of protection defined by the appended patent claims.

I claim:

1. In an aqueous ink having an extended cap-off time for writing, drawing, painting and/or printing on normal paper or other absorbent writing carriers, for use in fountain pens, ballpoint pens or stencil pen or pencils, in felt-tip pens, as well as in ink-jet systems and/or other capillary duct writing devices or systems, the ink being a mixture comprised of water as a predominant or exclusive solvent, one of hydrocolloid and polysaccharide as binding agent or film-forming agent, moist-keeping agents, coloring agents, emulsifying agents and possible additional additives, the improvement comprising the ink containing gum arabic and bees wax as the film-forming agents.

2. The ink according to claim 1, wherein at least one of the hydrocolloid, the polysaccharide and the gum arabic is present as an aqueous solution prior to being added to the ink mixture.

3. The ink according to claim 2, wherein the hydrocolloid is present in the solution in an amount of 2–20% by weight prior to being added to the ink mixture.

4. The ink according to claim 1, wherein the bees wax is present as an aqueous emulsion prior to being added to the ink mixture.

5. The ink according to claim 4, wherein the bees wax is present in the aqueous emulsion in an amount of 10–30% by weight prior to being added to the ink mixture.

6. The ink according to claim 1, wherein the coloring agent is comprised of at least one water soluble dye.

7. The ink according to claim 1, wherein the ink contains 0,1–10% by weight of soluble coloring agents or water soluble dyes.

8. The ink according to claim 1, wherein the coloring agent is comprised of at lease one food dye and/or at least one acid dye.

9. The ink according to claim 8, wherein the coloring agent is selected from the group consisting essentially of Food Yellow 3; Food Yellow 13; Food Yellow 4; Food Red 7; Food Red 14; Food Blue 2 and Food Blue 3.

10. The ink according to claim 8, wherein the coloring agent is selected from the group consisting essentially of Acid Yellow 23; Acid Red 18; Acid Red 51; Acid Orange 4; Acid Blue 93; Acid Blue 9; Acid Blue 104 and Acid Violet 49.

11. The ink according to claim 1, wherein the ink has a moist-keeping agent content of 10–40% by weight.

12. The ink according to claim 11, wherein the moist-keeping agent is diethylene glycol, glycerine, propylene glycol or polyglycol.

13. The ink according to claim 12, comprising 25–35% by weight diethylene glycol as the moist-keeping agent.

14. The ink according to claim 1, wherein the additional additives are buffer agents or preservatives.

15. The ink according to claim 14, wherein the buffer agent is triethanol amine and the preservatives are a mixture of tertiary butyl hydroperoxide and monophenyl glycol ether.

16. The ink according to claim 15, wherein the preservatives are comprised of a mixture of 10–60% by weight tertiary butyl hydroperoxide and 2–50% by weight of one or more monophenyl glycol ethers.

17. The ink according to claim 1, wherein the ink contains 0.1–0.6% by weight of triethanol amine as a buffer agent.

18. The ink according to claim 1, wherein the ink has a pH-value of about 8.

19. The ink according to claim 1, wherein the ink contains at least one of 1–7% by weight emulsifying agent and 0.1–3% by weight preservative.

20. The ink according to claim 1, comprising nonionic emulsifying agents selected from the group consisting of alcohol fatty acid ester, ethylene fatty acid ester, polyethylene glycol fatty acid ester, glycerine- and polyfatty acid ester, sorbite fatty acid ester, pentaerythrite fatty acid ester, fatty acid ester of glycerine ester, saccharose fatty acid ester, alcohol polyglycol ether, fatty acid polyglycol ether, fatty acid ester polyglycol ether, fatty amine polyglycol ether, polyglycol ether of fatty acid alkanolamides, polyglycol ether of fats and oils, polypropylene glycol polyglycol ether, lanoline polyglycol ether, alcohol polypropylene glycol ether, fatty acid polypropylene glycol ether, polypropylene glycol ether of fatty amines, lanoline polypropylene glycol ether.

21. The ink according to claim 1, wherein the emulsifying agent is a mixture of 85–95% by weight hydrated castor oil and 2–8% by weight 1,2-propylene glycol.

22. The ink according to claim 1, wherein the preservative is a mixture of 12–60% by weight of tertiary butyl hydroperoxide, 3–50% by weight monophenyl glycol ether and optionally a diluting agent.

23. The ink according to claim 1, comprising 0.1–2% by weight gum arabic, 0.05–5% by weight bees wax, 0.1–10% by weight dyes, 10–40% by weight diethylene glycol, 1–7% by weight emulsifying agent, 0.1–3% by weight preservatives, 0.1–3% by weight buffer agent, and remainder water as a solvent.

24. In a process of manufacturing an aqueous ink having an extended cap-off time for writing, drawing, painting and/or printing on normal paper or other absorbent writing carriers, for use in fountain pens, ballpoint pens or stencil pen or pencils, in felt-tip pens, as well as in ink-jet systems and/or other capillary duct writing devices or systems, the ink being comprised of water as a predominant or exclusive solvent, one of hydrocolloid and polysaccharide as binding agent or film-forming agent, moist-keeping agents, coloring agents, emulsifying agents and possible additional additives, the improvement comprising manufacturing the ink as an oil-in-water emulsion, further comprising the steps of preparing a bees wax emulsion and a gum arabic solution, preparing a basic mixture of the bees wax emulsion and the gum arabic solution and adding a moist-keeping agent and an emulsifying agent, preparing an initial mixture from solvent, preservative and buffer agent, preparing a coloring solution by adding a dye to the initial mixture, and preparing the ink by stirring the basic mixture into the coloring solution.

25. The process according to claim 24, comprising initially preparing a first mixture of bees wax, emulsifying agent and water as the bees wax emulsion.

26. The process according to claim 24, preparing the gum arabic solution as a mixture of gum arabic, preservative and water.

27. The process according to claim 24, comprising preparing the basic mixture as a mixture of the gum arabic solution, the bees wax emulsion, an additional emulsifying agent and moist-keeping agent.

* * * * *